Dec. 9, 1924.
J. H. RAND
INDEX FRAME
Filed Sept. 19, 1921
1,518,354
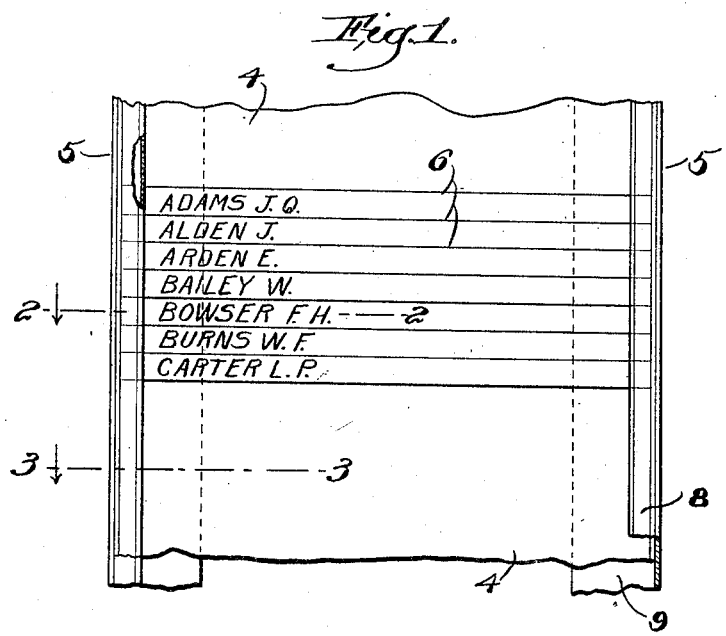
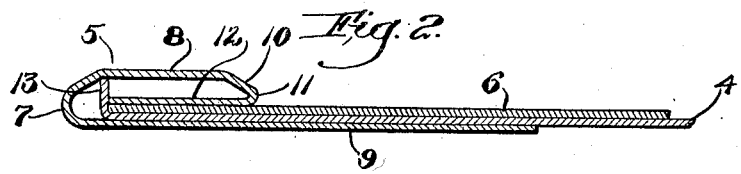
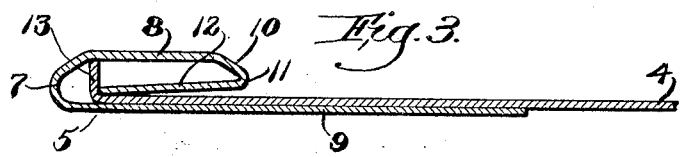

Patented Dec. 9, 1924.

1,518,354

UNITED STATES PATENT OFFICE.

JAMES H. RAND, OF NORTH TONAWANDA, NEW YORK.

INDEX FRAME.

Application filed September 19, 1921. Serial No. 501,769.

*To all whom it may concern:*

Be it known that I, JAMES H. RAND, citizen of the United States of America, and resident of North Tonawanda, in the county of Niagara and State of New York, have invented new and useful Improvements in Index Frames, of which the following is a specification.

This invention relates to index frames of the kind used in so-called visible indexes, for holding and displaying removable index strips, cards, or similar index elements, and particularly to index frames comprising essentially a cover sheet and side flanges for engaging the ends of the index elements.

It has heretofore been common practice to make index frames of this type from an integral piece of sheet metal with its side margins bent over to form the retaining flanges. To secure greater lightness, resiliency, compactness, and other qualities inherent in materials other than sheet metal, it has also been proposed to make the back and side flanges in separate pieces and from different kinds of sheet material, and to fasten them together by gluing, stapling or riveting. If the parts of the frame are of different materials and of different coefficients of expansion, changes of temperature and humidity cause index frames so assembled to warp and buckle. Moreover the method of fastening the parts adds to the cost of manufacture, and in certain instances detracts from the appearance of the index.

One object of the invention is to produce a superior index frame of the type described by securing the parts together by an interlock which prevents lateral movement, allows for different ratios of expansion lengthwise of the frame, and permits rapid assembly of the parts.

In index frames as heretofore constructed, the edges of the retaining flanges have projected from the face of the index in such a way that when a number of the frames are mounted close together, face to back, with provision for edgewise movement to bring any frame into view, the back of the frame being moved is likely to catch against the edge of the retaining flange on the next adjacent frame over whose face the moving frame slides, thereby bending the flange out of shape or disfiguring it, and also interfering with the proper action of the frames when thus mounted in a series.

It is a further object of this invention to provide retaining flanges of such form as to offer no obstruction to relative movement of the surfaces of the frames one over another.

One embodiment of the invention is shown in the accompanying drawings, in which,—

Fig. 1 is a front view of a portion of an index frame, parts being cut away to show the structure;

Fig. 2 is an enlarged sectional view on the line 2—2 of Fig. 1; and

Fig. 3 is a similar sectional view on the line 3—3 of Fig. 1.

The particular embodiment of the invention shown for the purpose of illustration comprises a back or back plate 4, and side pieces 5 which form the retaining flanges for clamping the index elements, such as name strips 6, upon back 4. Back 4 may be of any suitable material which is thin, light and has the necessary rigidity, but is preferably of sheet metal such as aluminum. The side pieces 5 of resilient material, preferably sheet celluloid, are of approximately the same length as back 4 and are folded upon themselves as at 7 forming approximately parallelly disposed top and bottom portions 8 and 9 which receive therebetween the edges of back 4. The top portion 8 is inclined inwardly as at 10, forming a beveled surface over which the edge of the next adjacent frame will readily slide without catching upon or injuring it. Thence the margin of the top portion is rolled or folded under at 11 to form a clamping lip 12 under which the index strips 6 are held. The bend of the fold or roll 11 is sufficiently sharp to permit the edge of the next adjacent frame readily to slide up the bevel 10 without encountering any appreciable obstacle, but at the same time has sufficient curve to admit of the ready insertion of the index strips 6 between the lip 12 and the frame back 4.

The folded under lip 12 extends nearly to the bend 7, and preferably inclines downwardly or rearwardly as shown in Fig. 3, thus providing a slightly open channel to receive the ends of the index strips, and also providing a spring lip 12 which has its main gripping or pinching action at or near its free edge.

The side pieces 5 are interlocked with the edges of the back 4, and secured against lateral displacement by a narrow flange 13 struck up from each side edge of the back 4 and standing at substantially right angle thereto. This flange 13 is received within the fold 7 of the side member between the top and bottom members 8 and 9 and is engaged by the free edge of the folded under lip 12.

The frame is assembled by sliding the side pieces endwise upon the back plate with the parts arranged as shown in Fig. 3. The rear members 9 of the side pieces 5 lie flat and snug against the rear side of the back plate, and the front members 8 and infolded lips 12 constitute resilient flanges for gripping and retaining the ends of index elements 6, the free edges of lips 12 forming stops bearing on the flanges 13 and locking the side pieces 5 against lateral displacement outwardly with relation to the back plate.

The rolled folds 7 and 11 provide a double spring which allow the retaining flange made up of the parts 8 and 12 freely to yield without dislodging the edge of lip 12 from flange 13, to receive and grip index strips 6 of varying thicknesses from the thinnest paper to strips substantially as thick at the height of flanges 13 less the thickness of lip 12. Since the parts are not rigidly and immovably fastened together as by gluing or riveting any slight relative longitudinal movement due to unequal expansion or contraction may take place without distortion of the frame, and at the same time the parts are securely locked against relative lateral movement.

I claim:

1. An index frame comprising side channels and a cover sheet bridging the space between the channels, said sheet extending into said channels but being slidable relatively thereto, and said channels being constructed and arranged to hold the ends of index slips, said cover sheet contacting with the index slips to hold the latter in predetermined position.

2. An index frame comprising a back and sides interlocked transversely of the frame but relatively slidable longitudinally thereof, the sides having portions overlapping the front of the back and the inner edges of the overlapping portions being spaced from the back to hold opposite ends of indices against the back.

3. An index frame comprising a back, a flange adjacent the edge thereof, a resilient member having a double fold slidable upon said back whereby the flange is received between the portions of the resilient member made by the first fold and is contacted by the edge of the portion made by the second fold.

4. An index frame comprising a back plate and side pieces enclosing the side margins of the back plate, the side pieces interlocking with the back plate transversely of the frame but sliding longitudinally thereof, the sides being constructed and arranged to hold indices in front of the back plate.

5. An index frame comprising a back plate and side pieces interlocked transversely of the frame but relatively slidable longitudinally thereof, the side pieces overlapping the back plate and resiliently gripping the latter frictionally to restrain relative longitudinal sliding, and the portions of the side pieces overlapping the front of the back being arranged resiliently to hold the opposite ends of the indices against the back.

6. An index frame comprising a back, a flange along one edge thereof, and a resilient member folded to overlap said back upon both sides and having a second fold at one side forming an interlock with said flange to prevent lateral displacement of said member relative to said back.

7. An index frame comprising a metallic back, celluloid side members therefor and means for holding said members upon said back against lateral movement but permitting relative longitudinal movement.

8. An index frame comprising a back having a flange angularly disposed thereto, a resilient side member folded upon itself and enclosing the flange and the adjacent portion of said back, and means on said resilient side member coacting with said flange to form an interlock.

9. An index frame comprising a back having a flange angularly disposed thereto and a side member folded to form approximately parallel faces receiving said first member therebetween, one of said faces being folded under to form a lip engaging said flange and thereby preventing separation of said members.

10. An index frame comprising a sheet metal back having a margin bent up to form a narrow flange disposed at approximately right angles to the back, and a side member of sheet celluloid folded upon itself and enclosing the flange and the adjacent portion of the back, the rear part of said side member lying flat against the rear surface of the back and the front part of said side member being infolded to form a resilient lip which presses toward the front surface of the back with its free edge engaging the flange on the back, thereby locking the parts against lateral displacement but permitting relative longitudinal movement.

11. An index frame comprising side channels and a cover sheet bridging the space between the channels, said sheet extending into said channels but being unattached thereto, and said channels being constructed and arranged to hold the ends of index slips, said cover sheet contacting with the index slips to hold the latter in predetermined position and the index slips being accessible from the side opposite said sheet for adjustment and replacement.

Signed by me at Boston, Massachusetts, this fifteenth day of September, 1921.

JAMES H. RAND.